R. BRINEY.
Sucker Rod Socket or Drill Grab.
No. 201,386.   Patented March 19, 1878.
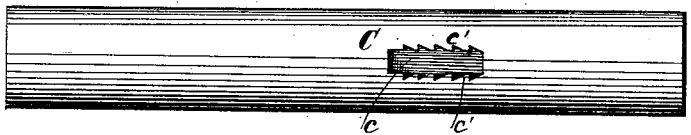
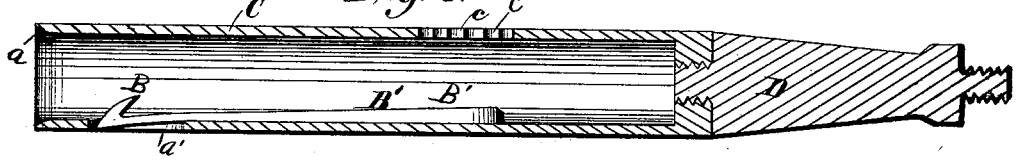
Attest:
Inventor.
Reuben Briney

UNITED STATES PATENT OFFICE.

REUBEN BRINEY, OF KITTANNING, PENNSYLVANIA.

IMPROVEMENT IN SUCKER-ROD SOCKETS OR DRILL-GRABS.

Specification forming part of Letters Patent No. 201,386, dated March 19, 1878; application filed October 6, 1877.

*To all whom it may concern:*

Be it known that I, REUBEN BRINEY, of Kittanning, in the county of Armstrong and State of Pennsylvania, have invented a new and useful Sucker-Rod Socket, which is fully set forth in the following specification, reference being had to the accompanying drawings.

The object of my invention is to provide an improved sucker-rod socket; and it consists in a hollow socket or casing having slots in its sides, and in which is secured a hook having a curved and enlarged shank, all arranged and adapted as and for the purposes hereinafter set forth.

In the drawings, Figure 1 is a side elevation of the socket and a vertical section of a portion of the well-tubing. Fig. 2 is the socket with the pin removed, and Fig. 3 is a vertical section of the socket and pin.

A is a portion of the tubing of a well, and C is the socket for catching the sucker-rod. D is the pin or head which attaches the operating-rods to the machinery above.

The socket C is a solid piece of tubing, and has the inner edges of its lower end chamfered, as shown at $a$, to facilitate the entry of the sucker-rod into the socket. It has formed through its side, near its lower end, the slot $a^1$, connected with which is the short cross-slot $a^2$, and it has also the slot $c$ formed through its side, diametrically opposite to the slot $a^1$ and near its upper end, or about two-thirds of its length upward from the lower end or mouth $a$. The slot $c$ has formed on its sides the teeth $c'$.

B is a hook, having the curved shank B', which slightly enlarges toward its upper end. The back of the hook B is placed in the slot $a^1$, while the shank B' extends upward inside of the socket, and is firmly riveted in position immediately opposite the slot $c$, as shown in Fig. 3. The shank is slightly curved, as shown, so that the hook will spring outward in the slot $a^1$ as the sucker-rod is forced upward into the socket.

The upper end of the socket is suitably constructed, so that it can be attached to the pin or head D, or by other suitable means connected with the rods reaching upward to the operating machinery.

The cross-slot $a^2$ gives facilities whereby a suitable instrument may be inserted under the shank B' for the purpose of lifting the hook B out of the extracted sucker-rod.

In the operation of the device, the sucker-rod enters the lower end of the socket, and is forced upward past the hook B and enlarged end of the shank B'. The enlarged end B' crowds the sucker-rod firmly against the opposite side of the socket and against the teeth $e'$ in the slot $c$. When the sucker-rod is made of wood, it will be jammed so firmly against the side of the socket that portions of it will be driven into the slot $c$, and ordinarily this hold would be sufficient to raise it from the well.

The hook B is, by its shape, driven into the wood of the sucker-rod the moment the upward movement in the rod is commenced.

This device, as will be seen, is very simple in construction, and is not liable to get out of order. The solid or continuous tube C prevents the end of the sucker-rod from bending outward and interfering with the upward movement of the socket.

I am aware of the existence of the patent to R. S. Torry, August 6, 1867, and I do not claim the invention described in his specification; but, Having described my invention, what I claim, and desire to secure by Letters Patent, is—

The continuous tube or socket C, having the slot $a^1$ near its lower end, and the slot $c$, with teeth $c'$, near its upper end and diametrically opposite the slot $a^1$, and hook B, placed in the slot $a^1$, and having the enlarged shank B' extending upward in the socket and secured immediately opposite the slot $c'$, substantially as and for the purpose set forth.

REUBEN BRINEY.

Witnesses:
HENRY J. HAYS,
S. C. KING.